(12) United States Patent
Horii et al.

(10) Patent No.: US 6,690,745 B1
(45) Date of Patent: Feb. 10, 2004

(54) CIRCUIT FOR DETECTING THE PHASE OF RECEIVED SIGNAL

(75) Inventors: Akihiro Horii, Zama (JP); Kenichi Shiraishi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/463,233

(22) PCT Filed: Jul. 22, 1998

(86) PCT No.: PCT/JP98/03262

§ 371 (c)(1),
(2), (4) Date: Jan. 21, 2000

(87) PCT Pub. No.: WO99/05835

PCT Pub. Date: Feb. 4, 1999

(30) Foreign Application Priority Data

Jul. 24, 1997 (JP) .............................................. 9-212746
Jul. 24, 1997 (JP) .............................................. 9-212747

(51) Int. Cl.$^7$ ......................... H04L 27/06; H04L 27/22; H04L 7/00
(52) U.S. Cl. ......................... 375/316; 375/331; 375/365
(58) Field of Search ................................. 375/371, 326, 375/355, 363–366, 279, 280, 281, 329, 331, 316; 370/509–514

(56) References Cited

U.S. PATENT DOCUMENTS

| | | | | | |
|---|---|---|---|---|---|
| 4,346,470 A | * | 8/1982 | Alvarez, III et al. | ....... | 370/324 |
| 5,646,935 A | * | 7/1997 | Ishikawa et al. | ............ | 370/207 |
| 5,740,204 A | * | 4/1998 | Nagashima | ................. | 375/341 |
| 5,742,642 A | * | 4/1998 | Fertner | ........................ | 375/233 |
| 5,905,767 A | * | 5/1999 | Fujimura | ..................... | 375/355 |
| 6,246,281 B1 | * | 6/2001 | Horii et al. | ................. | 329/304 |
| 6,341,123 B1 | * | 1/2002 | Tsujishita et al. | ........... | 370/210 |
| 6,597,725 B1 | * | 7/2003 | Ishii | ........................... | 375/136 |
| 2002/0015423 A1 | * | 2/2002 | Rakib et al. | ................ | 370/485 |

FOREIGN PATENT DOCUMENTS

| | | |
|---|---|---|
| JP | 53-137657 | 12/1978 |
| JP | 60-10855 | 1/1985 |
| JP | 62-216557 | 9/1987 |
| JP | 9-83598 | 3/1997 |

* cited by examiner

*Primary Examiner*—Tesfaldet Bocure
(74) *Attorney, Agent, or Firm*—Eric J. Robinson; Robinson Intellectual Property Law Office, P.C.

(57) ABSTRACT

A received signal phase detecting circuit in provided in which the circuit scale is small. The circuit functions so as to capture a frame synchronizing signal from a demodulated baseband signal, extract a symbol stream during the period of frame synchronizing signal from the demodulated baseband signal through delay circuits (41, 42) at a timing matching the bit stream of the captured synchronizing signal, rotating the phase of a corresponding symbol extracted from the symbol stream when the big in the bit in the bit stream is logic "0" by 80°, outputting the symbol after the phase rotation and a corresponding symbol extracted from the symbol stream when the bit in the bit stream is logic "1" from a 0°/180° phase rotating circuit (43), operating the cumulative average of the output from the 0°/180° phase rotating circuit (43) for a specific period through cumulative averaging circuits (45, 46), rotating the phase of the outputs therefrom through a 22.5° phase rotating circuit (48), and determining the phase of the output therefrom by a phase determining circuit (49).

5 Claims, 11 Drawing Sheets

| INPUT CONDITIONS | R(3) |
|---|---|
| RVI>0, RVQ≧0, AND \|RVI\|>\|RVQ\| | 0 |
| RVI>0, RVQ>0, AND \|RVI\|≦\|RVQ\| | 1 |
| RVI≦0, RVQ>0, AND \|RVI\|<\|RVQ\| | 2 |
| RVI<0, RVQ>0, AND \|RVI\|≧\|RVQ\| | 3 |
| RVI<0, RVQ≦0, AND \|RVI\|>\|RVQ\| | 4 |
| RVI<0, RVQ<0, AND \|RVI\|≦\|RVQ\| | 5 |
| RVI≧0, RVQ<0, AND \|RVI\|<\|RVQ\| | 6 |
| RVI>0, RVQ<0, AND \|RVI\|≧\|RVQ\| | 7 |

FIG. 10

| INPUT CONDITIONS | R(3) IN 22.5° ROTATION | R(3) IN 67.5° ROTATION | R(3) IN 112.5° ROTATION | R(3) IN 157.5° ROTATION | R(3) IN 202.5° ROTATION | R(3) IN 247.5° ROTATION | R(3) IN 292.5° ROTATION | R(3) IN 337.5° ROTATION |
|---|---|---|---|---|---|---|---|---|
| RVI>0, RVQ≥0, AND \|RVI\|>\|RVQ\| | 0 | 7 | 6 | 5 | 4 | 3 | 2 | 1 |
| RVI>0, RVQ>0, AND \|RVI\|≤\|RVQ\| | 1 | 0 | 7 | 6 | 5 | 4 | 3 | 2 |
| RVI≤0, RVQ>0, AND \|RVI\|<\|RVQ\| | 2 | 1 | 0 | 7 | 6 | 5 | 4 | 3 |
| RVI<0, RVQ>0, AND \|RVI\|≥\|RVQ\| | 3 | 2 | 1 | 0 | 7 | 6 | 5 | 4 |
| RVI<0, RVQ≤0, AND \|RVI\|>\|RVQ\| | 4 | 3 | 2 | 1 | 0 | 7 | 6 | 5 |
| RVI<0, RVQ<0, AND \|RVI\|≤\|RVQ\| | 5 | 4 | 3 | 2 | 1 | 0 | 7 | 6 |
| RVI≥0, RVQ<0, AND \|RVI\|<\|RVQ\| | 6 | 5 | 4 | 3 | 2 | 1 | 0 | 7 |
| RVI>0, RVQ<0, AND \|RVI\|≥\|RVQ\| | 7 | 6 | 5 | 4 | 3 | 2 | 1 | 0 |

FIG. 12(a)

| INPUT | OUTPUT |
|---|---|
| "000" | "000" |
| "001" | "001" |
| "010" | "011" |
| "011" | "010" |
| "100" | "110" |
| "101" | "111" |
| "110" | "101" |
| "111" | "100" |

FIG. 12(b)

| INPUT | OUTPUT |
|---|---|
| "000" | "000" |
| "001" | "001" |
| "011" | "010" |
| "010" | "011" |
| "110" | "100" |
| "111" | "101" |
| "101" | "110" |
| "100" | "111" |

FIG. 13

| INPUT CONDITIONS | R(3) |
|---|---|
| RVI>0, RVQ≧0, AND |RVI|>|RVQ| | 0 |
| RVI>0, RVQ>0, AND |RVI|≦|RVQ| | 1 |
| RVI≦0, RVQ>0, AND |RVI|<|RVQ| | 3 |
| RVI<0, RVQ>0, AND |RVI|≧|RVQ| | 2 |
| RVI<0, RVQ≦0, AND |RVI|>|RVQ| | 6 |
| RVI<0, RVQ<0, AND |RVI|≦|RVQ| | 7 |
| RVI≧0, RVQ<0, AND |RVI|<|RVQ| | 5 |
| RVI>0, RVQ<0, AND |RVI|≧|RVQ| | 4 |

CIRCUIT FOR DETECTING THE PHASE OF RECEIVED SIGNAL

TECHNICAL FIELD

The present invention relates to a circuit for detecting the phase of a received signal and more particularly, to a circuit for detecting the phase of a received signal that is used in a receiver that receives a digitally modulated wave transmitted under a plurality of modulations with respective different C/N ratios that are required and which detects a phase angle of a received signal.

BACKGROUND ART

In a broadcast receiver that receives a digitally modulated wave applied with hierarchical transmission system in which a plurality of modulations with respective different C/N ratios that are required, for example 8PSK modulation, QPSK modulation and BPSK modulation, are combined in terms of timing and a digitally modulated wave under such modulations is repeatedly transmitted in successive frames, frame synchronizing signals are captured from demodulated base band signals (hereinafter referred to as symbol stream as well), a received signal phase rotation angle at the present time point is obtained from a signal point arrangement of the captured frame synchronizing signal, and the demodulated base band signals are subjected to opposite phase rotation based on the obtained received signal phase rotation angle, thereby making the demodulated base band signals coincide with the transmitted signal phase angle so as to be in absolute phase.

A conventional received signal phase detecting circuit, as shown in FIG. 1, comprises: a modulating circuit 1; a frame synchronization detecting circuit 2; and a frame synchronizing signal generator 3; and in addition, delay circuits 41 and 42 constituting a block for detecting a received signal phase; a 0°/180° phase rotating circuit 43; cumulative averaging circuits 45 and 46; and a received signal phase determining circuit 47 that performs phase determination of a received signal under application of a conversion table using ROM. The frame synchronization detecting circuit 2 and the frame synchronizing signal generator 3 correspond to frame synchronizing signal capturing means for capturing a frame synchronizing signal from the demodulated base band signals and the delay circuits 41 and 42 correspond to extracting means for extracting symbol streams in the period of a frame synchronizing signal from the demodulated base band signals at the timing at which the symbol streams coincide with a bit stream of the synchronizing signal captured and reproduced by the frame synchronizing signal capturing means.

The conventional received signal phase detecting circuit shown in FIG. 1 performs frequency conversion of a received digitally modulated wave to a predetermined intermediate frequency signal, supplies the intermediate frequency signal subjected to frequency conversion to the demodulating circuit 1 so as to demodulate and the demodulating circuit 1 sends out, for example, demodulated base band signals I(8) and Q(8) (hereinafter also referred to as base band signals I and Q, omitting the figures in each of the parentheses that indicates the number of bits together with the parentheses) of 8 bits that are quantized. The demodulated base band signals I(8) and Q(8) are also sent out to the frame synchronization detecting circuit 2 in order to capture a frame synchronizing signal, for example, that has been BPSK-modulated.

Description will here be made of mapping for each modulation method on the transmission side using FIGS. 2(a) to (c). FIG. 2(a) shows signal point arrangement in a case where 8PSK modulation is used as a modulation method. In the 8PSK modulation method, a digital signal of 3 bits (a, b, c) can be transmitted as 1 symbol, wherein combinations of bits that constitute 1 symbol are (0, 0, 0), (0, 0, 1), to (1, 1, 1), which are totaled in 8 ways. The digital signals each of 3 bits are converted to signal point arrangements 0 to 7 on the I-Q vector plane on the transmission side of FIG. 2(a), which conversion is generally called as 8PSK mapping.

In the example shown in FIG. 2(a), the bit sequence (0, 0, 0) is converted to a signal point arrangement "0", a bit sequence (0, 0, 1) to a signal point arrangement "1", a bit sequence (0, 1, 1) to a signal point arrangement "2", a bit sequence (0, 1, 0) to a signal point arrangement "3", a bit sequence (1, 0, 0) to a signal point arrangement "4", a bit sequence (1, 0, 1) to a signal point arrangement "5", a bit sequence (1, 1, 1) to a signal point arrangement "6", and a bit sequence (1, 1, 0) to a signal arrangement "7".

FIG. 2(b) shows signal point arrangements in a case where QPSK modulation is used as a modulation method and in the QPSK modulation method, a digital signal of 2 bits (d, e) can be transmitted as 1 symbol, wherein combinations of bits constituting the symbol are totaled in 4 ways of (0, 0), (0, 1), (1, 0) and (1, 1). In the example of FIG. 2(b), for example, a bit sequence (1, 1) is converted to "1", a bit sequence (0, 1) to "3", a bit sequence (0, 0) to "5", and a bit sequence (1, 0) to "7". It should be noted that a relation between a signal point arrangement and a arrangement number in each of other modulation methods is held in the same way as the relation in case of 8PSK modulation as a standard.

FIG. 2(c) shows signal point arrangements in a case where BPSK modulation is used as a modulation method and in the BPSK modulation method, a digital signal (f) of 1 bit is transmitted as 1 symbol. Conversion of the digital signal (f) is such that, for example, (1) is converted to a signal point arrangement "0" and (0) is converted to a signal point arrangement "4".

Now, description will be made of a frame synchronizing signal. In the hierarchical transmission system, a frame synchronizing signal is transmitted after being subjected to BPSK modulation with the lowest C/N ratio that is required. When arrangement is such that a bit stream of a frame synchronizing signal constituted of 16 bits is (S0, S1, . . . S14, S15), wherein the bit steam is sequentially sent out from S0, and a bit stream (0, 0, 0, 1, 0, 0, 1, 1, 0, 1, 0, 1, 1, 1, 1, 0) or a bit sequence (0, 0, 0, 1, 0, 0, 1, 1, 1, 0, 1, 0, 0, 0, 0, 1), the latter of which is the former sequence whose latter half 8 bits are inverted, are alternately sent out in successive frames. Hereinafter, the symbol stream of a frame synchronizing signal is also referred to as "SYNCPAT" or "nSYNCPA"T, the latter mark of which is the former symbol stream whose latter half 8 bits are inverted. The symbol streams are converted with BPSK mapping shown in FIG. 2(c) on the transmission side to a signal point arrangement "0" or "4" and the converted symbol steam is transmitted.

When it is confirmed by a demodulated base band signal in the frame synchronization detecting circuit 2 that symbol streams of frame synchronizing signals "SYNCPAT" and "nSYNCPAT" that, as described above, are BPSK-mapped are alternately received in a repeating manner in constant frame intervals, it is judged that frame synchronization is established and a frame synchronization pulse is output in each frame period.

In a hierarchical transmission system in which normally, a plurality of modulation methods with respective different C/N ratios that are required are combined in terms of timing and a digitally modulated wave is repeatedly transmitted in successive frames, header data indicating the multiple combinations are multiplexed and a header data indicating the multiple combinations is extracted in response to a timing signal that is generated by a frame synchronizing pulse that is output from the frame synchronization detecting circuit 2 after it is judged that the frame Synchronization has been established. As a result, it is after a frame multiple combination is known that processings for different modulation types are separately enabled.

In other words, since the demodulating circuit 1 operates as an 8PSK demodulating circuit by the time when it is judged that frame synchronization has been established, the I and Q axes of the I-Q vector plane on the reception side are subjected to phase rotation by θ=45°×n, where n is one of integers of n=0 to 7, as compared with those on the transmission side according to a phase state of a demodulated carrier wave reproduced in a carrier wave reproducing circuit of the demodulating circuit 1. For example, in a case of a frame synchronizing signal transmitted after being BPSK-modulated, symbol streams of the frame synchronizing signal that are BPSK-mapped such as to convert a bit "1" and a bit "0" to a signal point arrangement "0" and a signal point arrangement "4" respectively have 8 demodulated phases of the frame synchronizing signal according to a phase state of a demodulated carrier wave: a case where being arranged at signal point arrangements "0" and "4" same as on the transmission side, a case where being arranged at signal arrangements "1" and "5" that receive phase rotation by θ=45° relative to the signal point arrangements on the transmission side and a case where being arranged at signal point arrangements "2" and "6" that receive phase rotation by θ=90° relative to the signal point arrangements on the transmission side.

Signals transmitted after being modulated by means of QPSK modulation and 8PSK modulation are affected by phase rotation similar to the case of PBSK modulation. When a case where the maximum number of phases of PSK modulation in which a digitally modulated wave is repeatedly transmitted in successive frames with combinations of bits in terms of timing is 8, that is a case of 8PSK modulation, is considered, there are 8 received signal phases, each of which is shifted by 45° from the adjacent phase state.

A phase rotation angle of a received signal, however, can be obtained by comparison of a signal point arrangement of a frame synchronizing signal that is already known on the transmission side with a signal point arrangement of a frame synchronizing signal received. Description will below be made of this method of obtaining the phase rotation angle.

In the demodulating circuit 1 (see FIG. 1), a symbol stream of a frame synchronizing signal demodulated into base band signals is one that is obtained by BPSK-mapping "SYNCPAT" or "nSYNCPAT" constituted of a bit "1" or "0" on the transmission side and it is apparent from the respective signal point arrangements that a phase difference between the symbols of the bit "1" and "0" is 180°. Therefore, when all of symbols of the bit "0" included in a symbol stream of a frame synchronizing signal received are subjected to 180° phase rotation, a stream constituted of 16 symbols all with the bit "1" is obtained.

The average value of the obtained stream is acquired and the value is adopted as a point arrangement of a received signal for the bit "1". Now, since a signal point arrangement for the bit "1" of BPSK is "0", a received signal phase rotation angle θ is obtained by comparison of the signal point arrangement of the BSPK bit with the received signal point arrangement.

Definition is here made in regard to a relation of a received signal phase rotation angle θ and a phase rotation angle signal RT (3) that is an output of the received signal phase detecting circuit, as indicated by the following equation (1):

$$RT(3)=\theta/45 \tag{1}$$

where θ=n×45° and n is one of integers of n=0 to 7.

Further description will be described based on the conventional example of FIG. 1. The frame synchronizing signal generator 3 generates a bit stream of a reproduced frame synchronizing signal corresponding to the patterns "SYNCPAT" or "nSYNCPAT" of a frame synchronizing signal that the generator 3 has captured in response to reception of a frame synchronizing pulse output from the frame synchronization detecting circuit 2 and the bit stream of a reproduced frame synchronizing signal is supplied to the 0°/180° phase rotating circuit 43. The frame synchronizing signal generator 3 generates a frame synchronizing signal section signal based on the section of a frame synchronizing signal which the frame synchronizing signal generator 3 has captured and the frame synchronizing signal section signal is supplied to the delay circuits 41 and 42.

The delay circuits 41 and 42 that have received the frame synchronizing signal section signal delays a symbol stream of a frame synchronizing signal that is multiplexed into base band signals so that the symbol stream of a frame synchronizing signal that is multiplexed into the base band signals demodulated by the demodulating circuit 1 and a bit stream of a reproduced frame synchronizing signal sent out from the frame synchronizing signal generator 3 coincide with each other in the timing at the input end position of the 0°/180° phase rotating circuit 43.

Base band signals DI(8) and DQ(8) delayed by the delay circuits 41 and 42 are input to the 0°/180° phase rotating circuit 43. The output gates of the delay circuits 41 and 42 are opened only during a symbol stream section of a frame synchronization signal with 16 symbols by a frame synchronization signal section signal output from the frame synchronizing signal generator 3. At the input of the 0°/180° phase rotating circuit 43, a reproduced frame synchronizing signal output from the frame synchronizing signal generator 3 and the symbol stream of the frame synchronizing signal are made to be coincide with each other in timing by the delay circuits 41 and 42 as described above.

At this point, in the case of logic "0" based on whether a bit in a bit stream of the reproduced frame synchronizing signal supplied is logic "0" or logic "1", the 0°/180° phase rotating circuit 43 outputs a corresponding symbol in a symbol stream of a frame synchronizing signal that is multiplexed into demodulated base band signals that are supplied through the delay circuits 41 and 42 after performing a 180° phase rotation thereof, while in the case of logic "1", the 0°/180° phase rotating circuit 43 outputs a corresponding symbol in a symbol stream of a frame synchronizing signal that is multiplexed into demodulated base band signals that are supplied through the delay circuits 41 and 42 without performing any phase rotation thereof.

At the input of the 0°/180° phase rotating circuit 43, a symbol stream of a frame synchronizing signal that is multiplexed into demodulated base band signals and a bit stream of a reproduced frame synchronizing signal sent out from the frame synchronizing signal generator 3 are made to coincide with each other in timing by the delay circuits 41 and 42. Symbol streams DI(8) and DQ(8) of a frame synchronizing signal that are output from the delay circuits 41 and 42 whose output gates are opened by a frame synchronizing signal section signal sent out from the frame synchronizing signal generator 3, in the case where a bit stream of the reproduced frame synchronizing signal is logic "0", receives 180° phase rotation and are respectively sent out to the cumulative averaging circuits 45 and 46.

FIG. 3(*a*) shows signal point arrangements of a frame synchronizing signal when reception is effected at a received signal phase rotation angle θ=0° (absolute phase) and FIG. 3(*b*) shows how signal point arrangements of symbol streams VI(8) and VQ(8) after being converted in the 0°/180° phase rotating circuit 43 are arranged. The symbol streams VI(8) and VQ(8) are respectively sent out to the cumulative averaging circuits 45 and 46, cumulative averaging is performed in a predetermined section and symbol streams AVI(8) and AVQ(8) that are summed and averaged in each predetermined section are output. The cumulative averaging is performed on the symbol streams VI(8) and VQ(8) in order that a signal point arrangement is obtained in a stable manner even when a minor change in phase and/or a change in amplitude of a received base band signal occur by deterioration in a C/N ratio in reception.

Received signal points (AVI(8) and AVQ(8)) of a BPSK-mapped signal for a bit "1" are obtained in the cumulative averaging circuits 45 and 46. Then, the received signal points AVI(8) and AVQ(8) are input to the received signal phase determining circuit 47 and a phase rotation angle signal RT (3) of three bits corresponding to a phase rotation angle defined by the equation (1) is obtained based on a received signal phase determination table shown in FIG. 4. In case of a received signal phase rotation angle θ=0° for example, a phase rotation signal that has been determined using the received signal phase determination table with respect to signal points of AVI(8) and AVQ(8) is "0". Therefore, a bit sequence (0, 0, 0) is sent out as the phase rotation angle signal RT (3). Further, in a case of a received signal phase rotation angle θ=45°, a phase rotation signal is "1" likewise and therefore, a bit sequence (0, 0, 1) is sent out as the phase rotation angle signal RT(3).

Further, in a broadcast receiver that receives a digitally modulated wave applied with the hierarchical transmission system in which a digitally modulated wave that is transmitted through a plurality of modulation methods with respective different C/N ratios that are required which modulation methods are combined in terms of timing is repeatedly transmitted in successive frames, a phase rotation angle signal RT(3) is obtained in the received signal phase detecting circuit and demodulated base band signals I(8) and Q(8) are subjected to opposite phase rotation using a phase rotation angle signal RT(3) so as to be in absolute phase.

However, when using the above described conventional received signal phase detecting circuit, if the 0°/180° phase rotating circuit 43 is constituted of table conversion, a required memory capacity is 128 k bytes (=$2^{16}$×16 bits) and further if the received signal phase determining circuit 47 is constituted of table conversion, a required memory capacity is $2^{16}$×3 bits. In such a way, the scale of the circuits are large when the 0°/180° phase rotating circuit 43 and the received signal phase determining circuit 47 are constituted of table conversion and thereby a problem has been arisen because of such a large scale in circuit integration.

DISCLOSURE OF THE INVENTION

It is an object of present invention to provide a received signal phase detecting circuit whose circuit scale is small.

A received signal phase detecting circuit recited in claim 1 of the present invention comprises:

frame synchronizing signal capturing means for capturing a frame synchronizing signal from a demodulated base band signal;

extracting means for extracting a symbol stream in the period of a frame synchronizing signal from a demodulated base band signal at the timing at which the symbol stream coincides with a bit stream of the synchronizing signal captured and reproduced by the frame synchronizing signal capturing means; and a cumulative addition/subtraction averaging circuit to which the symbol stream extracted by the extracting means is input and in which when a bit in a bit stream of the reproduced synchronizing signal is logic "1", a corresponding symbol in the symbol stream extracted by the extracting means is added, and when the bit in a bit stream of the reproduced synchronizing signal is logic "0", a corresponding symbol in the symbol stream extracted by the extracting means is subtracted and results of cumulative addition/subtraction are averaged over a predetermined period, wherein a received signal phase is determined based on an output of the cumulative addition/subtraction averaging circuit.

According to the received signal phase detecting circuit recited in claim 1 of the present invention, a frame synchronizing signal is captured from a demodulated base band signal by the synchronizing signal capturing means and a symbol stream in the period of a frame synchronizing signal is extracted by the extracting means from a demodulated base band signal at the timing at which the symbol stream coincides with a bit stream of the synchronizing signal captured by the frame synchronizing signal capturing means. In the cumulative addition/subtraction averaging circuit, when a bit in a bit stream of the captured synchronizing signal is logic "1", a corresponding symbol in the symbol stream extracted by the extracting means is added, and when the bit in a bit stream of the captured synchronizing signal is logic "0", a corresponding symbol in the symbol stream extracted by the extracting means is subtracted, and results of cumulative addition/subtraction are averaged over a predetermined period. A phase of the received signal is determined based on an output from the cumulative addition/subtraction circuit.

According to a received signal phase detecting circuit recited in claim 1 of the present invention, a 0°/180° phase rotating circuit and a cumulative averaging circuit that have been conventionally used are replaced by a cumulative addition/subtraction averaging circuit and the 0°/180° phase rotating circuit is unnecessary, thereby reducing a circuit scale.

A received signal phase detecting circuit recited in claim 2 of the present invention comprises:

frame synchronizing signal capturing means for capturing a frame synchronizing signal from a demodulated base band signal;

extracting means for extracting a symbol stream in the period of a frame synchronizing signal from a demodulated base band signal at the timing at which the symbol stream coincides with a bit stream of the synchronizing signal captured and reproduced by the frame synchronizing signal capturing means;

0°/180° phase rotating means to which the symbol stream extracted by the extracting means is input, for outputting a corresponding symbol of the symbol stream extracted by the extracting means after performing 180° phase rotation on the corresponding symbol when a bit of a bit stream of the reproduced synchronizing signal is logic "0", and outputting a corresponding symbol of the symbol stream extracted by the extracting means after performing no phase rotation on the corresponding symbol when the bit of a bit stream of the reproduced synchronizing signal is logic "1";

a cumulative averaging circuit for summing outputs from the 0°/180° phase rotating means over a predetermined period;

a phase rotating circuit for performing phase rotation of an output from the cumulative averaging circuit by (22.5°+45°×n), where n is an integer selected from n =0 to 7; and a phase determining circuit for determining a phase of an output from the phase rotating circuit.

According to the received signal phase detecting circuit recited in claim 2 of the present invention, a frame synchronizing signal is captured from a demodulated base band signal by the synchronizing signal capturing means and a symbol stream in the period of a frame synchronizing signal is extracted from a demodulated base band signal by the extracting means at the timing at which the symbol stream coincides with a bit stream of the synchronizing signal captured by the frame synchronizing signal capturing means. With the bit stream extracted by the extracting means being received, a corresponding bit of the symbol stream extracted by the extracting means receives 180° phase rotation when a bit of the captured synchronizing signal is logic "0" and is output from the 0°/180° phase rotating means, and a corresponding symbol of the symbol stream extracted by the extracting means receives no phase rotation when the bit of the bit stream of the captured synchronizing signal is logic "1" and is output from the 0°/180° phase rotating means. Outputs from the 0°/180° phase rotating means are subjected to cumulative averaging over a predetermined period in the cumulative averaging circuit and are output therefrom, an output from the cumulative averaging circuit receives a phase rotation of (22.5°+45°×n), wherein n is an integer selected from n=0 to 7, in the phase rotating circuit and a phase of an output of the phase rotating circuit is determined by the phase determining circuit.

In this case, since a conventional received signal phase determining circuit that has table conversion using ROM is replaced with 0°/180° phase rotating means configured by a multiplier and an adder, and a phase determining circuit of a simple configuration, a circuit scale is reduced.

A received signal phase detecting circuit recited in claim 3 of the present invention comprises:

frame synchronizing signal capturing means for capturing a frame synchronizing signal from a demodulated base band signal;

extracting means for extracting a symbol stream in the period of a frame synchronizing signal from a demodulated base band signal at the timing at which the symbol stream coincides with a bit stream of a synchronizing signal captured and reproduced by the frame synchronizing signal capturing means;

a cumulative addition/subtraction averaging circuit to which the symbol stream extracted by the extracting means is input and in which when a bit in a bit stream of the reproduced synchronizing signal is logic "1", a corresponding symbol in the symbol stream extracted by the extracting means is added, and when the bit in a bit stream of the reproduced synchronizing signal is logic "0", a corresponding symbol in the symbol stream extracted by the extracting means is subtracted and results of cumulative addition/subtraction are averaged over a predetermined period;

a phase rotating circuit for performing phase rotation of an output from the cumulative addition/subtraction averaging circuit by (22.5°+45°×n), where n is an integer selected from n=0 to 7; and a phase determining circuit for determining a phase of an output from the phase rotating circuit.

According to the received signal phase detecting circuit recited in claim 3 of the present invention, a frame synchronizing signal is captured from a demodulated base band signal by the synchronizing signal capturing means and a symbol stream in the period of a frame synchronizing signal is extracted from a demodulated base band signal by the extracting means at the timing at which the symbol coincides with a bit stream of the synchronizing signal captured by the frame synchronizing signal capturing means. In the cumulative addition/subtraction averaging circuit, when a bit in a bit stream of the captured synchronizing signal is logic "1", a corresponding symbol in the symbol stream extracted by the extracting means is added, and when the bit in a bit stream of the captured synchronizing signal is logic "0", a corresponding symbol in the symbol stream extracted by the extracting means is subtracted, and results of cumulative addition/subtraction are averaged over a predetermined period. An output from the cumulative averaging circuit receives a phase rotation of (22.5°+45°×n), wherein n is an integer selected from n=0 to 7, in the phase rotating circuit and a phase of an output of the phase rotating circuit is determined by the phase determining circuit.

According to the received signal phase detecting circuit recited in claim 3 of the present invention, the 0°/180° phase rotating means and the cumulative averaging circuit employed in the received signal phase detecting circuit recited in claim 2 according to the present invention are replaced with the cumulative addition/subtraction averaging circuit and the 0°/180° phase rotating circuit is unnecessary, thereby reducing a circuit scale.

In the received signal phase detecting circuit recited in claim 3 of the present invention, a phase of a received signal may be determined in a phase determining circuit, which is arranged in a stage preceding the extracting means, based on an output of a cumulative addition/subtraction averaging circuit.

A received signal phase detecting circuit recited in claim 5 of the present invention comprises:

frame synchronizing signal capturing means for capturing a frame synchronizing signal from a demodulated base band signal;

a phase rotating circuit for performing phase rotation of a demodulated base band signal by (22.5°+45°×n), where n is an integer selected from n=0 to 7;

extracting means for extracting a symbol stream in the period of a frame synchronizing signal from a base band signal that is phase-rotated by the phase rotating circuit at the timing at which the symbol stream coincides with a bit stream of the synchronizing signal captured and reproduced by the frame synchronizing signal capturing means;

code inverting means to which the symbol stream extracted by the extracting means is input, for inverting a code of a corresponding symbol in the symbol stream extracted by the extracting means to output the corresponding symbol after the inversion only when a bit in a bit stream of the reproduced synchronizing signal is logic "0";

a phase determining circuit that determines a phase of an output from the code inverting means;

a gray code converter that performs gray code conversion of an output from the phase determining circuit;

majority determining means for receiving an output of the gray code converter and performing majority determination; and a binary code converter that performs binary code conversion of an output from the majority determining means, wherein an output from the binary code converter is adopted as a received signal phase rotation angle signal.

According to the received signal phase detecting circuit of the present invention, a frame synchronizing signal is captured from a demodulated base band signal by the synchronizing signal capturing means, the demodulated base band signal receives a phase rotation of (22.5°+45°×n), wherein n is an integer selected from n=0 to 7, by the phase rotating circuit and a symbol stream in the period of a frame synchronizing signal is extracted from the base band signal that has received phase rotation by the extracting means at the timing at which the symbol stream coincides with a bit stream of the synchronizing signal captured by the frame synchronizing signal capturing means. When the bit of a bit stream of the captured synchronizing signal is logic "0", a corresponding symbol in the symbol stream extracted by the extracting means is inverted by the code inverting means, a phase of an output from the code inverting means is determined by the phase determining circuit, an output from the phase determining circuit receives code conversion to a gray code by the gray code converter, majority determination is performed on an output from the gray code converter by the majority determining means, which receives the output from the gray code converter, an output from the majority determining means receives code conversion by the binary code converter, and a phase rotation angle of a received signal is eventually determined based on an output from the binary code converter.

According to a received signal phase detecting circuit of the present invention, a 0°/180° phase rotating circuit and a cumulative averaging circuit that have conventionally used are replaced with the 22.5° phase rotating circuit and code inverting means and the 0°/180° phase rotating circuit and the cumulative averaging circuit are unnecessary, thereby reducing a circuit scale.

In addition, according to a received signal phase detecting circuit of the present invention, since a circuit scale can be reduced by using majority determining circuits and two phase determination values adjacent to each other are different from each other is limited to one bit by gray-coding, therefore even in a case where there arise a minute change in phase and a change in amplitude of a received base band signal due to deterioration in a C/N ratio in reception, which has in turn entailed a false phase determination, an influence thereof can be minimized and reliability can be improved.

BRIEF DESCRIPTION OF THE DRAWINGS

FIG. 10 is a table used for description of operation when a phase rotation angle of a phase rotating circuit in a received signal phase detecting circuit according to the embodiment of the present invention, is another rotation angle;

FIGS. 12(a) and 12(b) are tables used for description of operations of gray code conversion and binary code conversion in a received signal phase detecting circuit according to the second embodiment of the present invention; and FIG. 13 is a table used for description of operation of phase determination in a received signal phase detecting circuit according to the second embodiment of the present invention.

DETAILED DESCRIPTION OF THE PREFERRED EMBODIMENT

Figure 5:
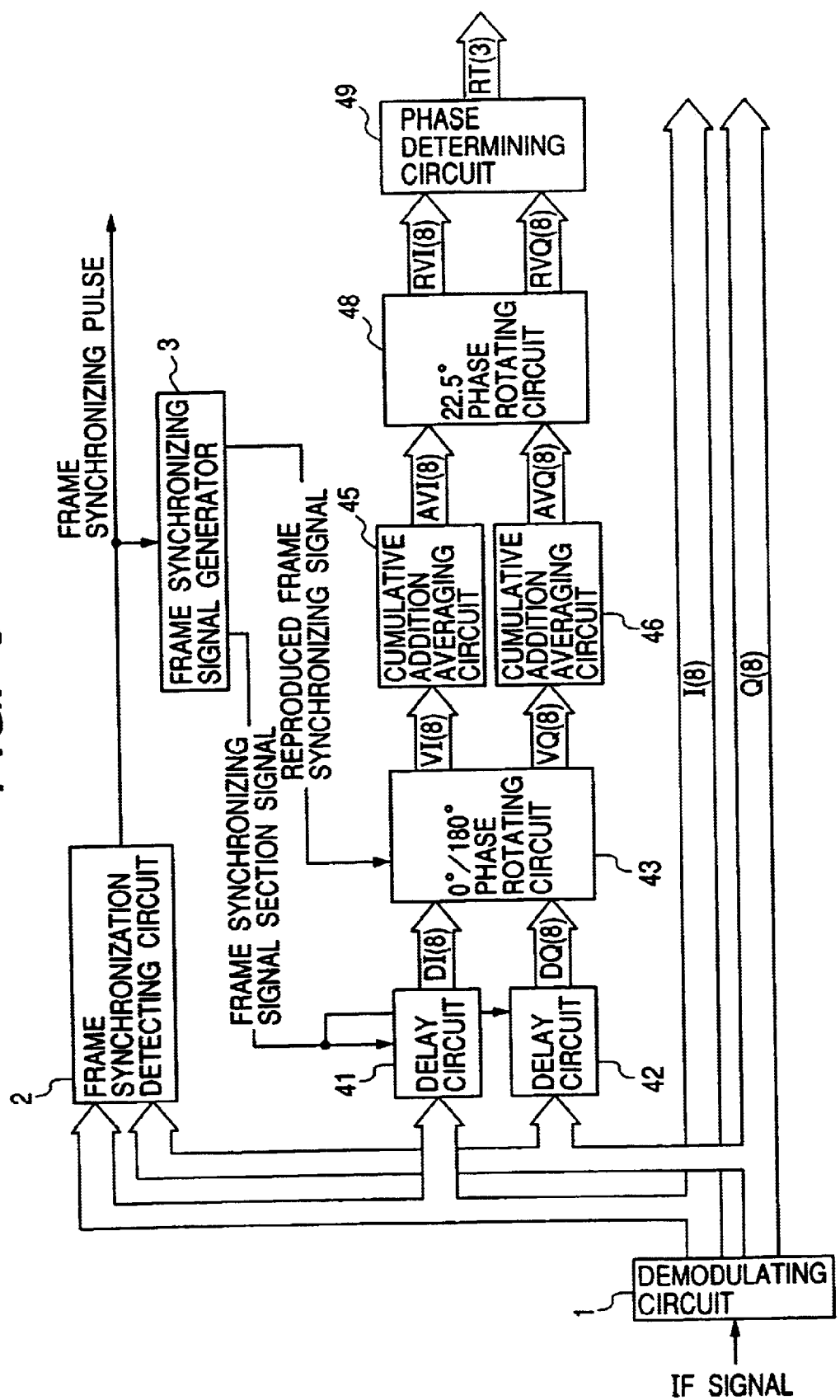
FIG. 5 is a block diagram showing configuration of a received signal phase detecting circuit according to an embodiment of the present invention.

A description will be made below of a received signal phase detecting circuit according to the present invention based on an embodiment thereof. FIG. 5 is a block diagram showing a configuration of a received signal phase detecting circuit according to the embodiment of the present invention.

A received signal phase detecting circuit according to the embodiment of the present invention comprises: a demodulating circuit 1; a frame synchronization detecting circuit 2; a frame synchronizing signal generator 3; and in addition to those, delay circuits 41 and 42 configuring a block for detection of a received signal phase; a 0°/180° phase rotating circuit 43; cumulative averaging circuits 45 and 46; a 22.5° phase rotating circuit 48; and a phase determining circuit 49.

That is, in the received signal phase detecting circuit according to the embodiment of the present invention, outputs AVI(8) and AVQ(8) from the cumulative averaging circuits 45 and 46 are supplied to the 22.5° phase rotating circuit 48 to receive phase rotation; and the phase rotation outputs RVI(8) and RVQ(8) are supplied to the phase determining circuit 49 to obtain a phase rotation angle signal RT(3). Herein, the received signal phase determining circuit 47 with table conversion using a ROM in a conventional example is replaced with the 22.5° phase rotating circuit 48 configured by a multiplier, an adder or the like, and a phase determining circuit 49 configured by a determining circuit or the like, such as a comparator or the like. The other parts of the configuration are same as the conventional example.

With such a configuration, in the received signal phase detecting circuit according the embodiment of the present invention, outputs AVI(8) and AVQ(8) from the cumulative averaging circuits 45 and 46 are supplied to the 22.5° phase rotating circuit 48 and a phase rotation of an angle 22.5°is performed according to the following equations (2) and (3). It should be noted that operations of the demodulating circuit 1, the frame synchronization detecting circuit 2, a frame synchronizing signal generator 3, the delay circuits 41 and 42 configuring a block for detection of a received signal phase, the 0°/180° phase rotating circuit 43, and the cumulative averaging circuits 45 and 46 are respectively same as those in the conventional case and therefore, descriptions thereof are omitted.

$$RVI=AVI\cos(22.5°)-AVQ\sin(22.5°) \quad (2)$$

$$RVQ=AVI\sin(22.5°)+AVQ\cos(22.5°) \quad (3)$$

Figure 1:
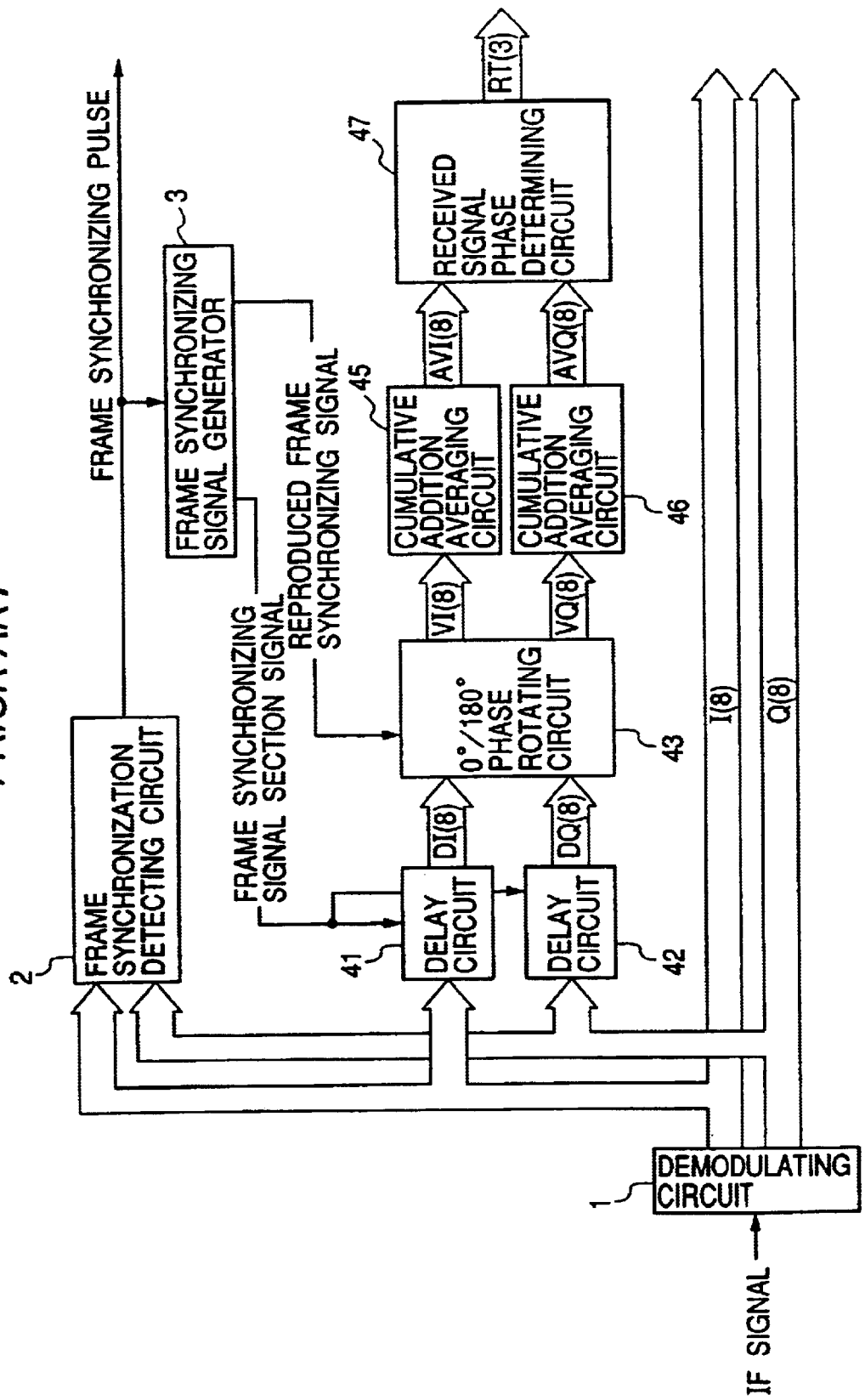
FIG. 1 is a prior art block diagram showing a configuration of a conventional received signal phase detecting circuit.
Figure 2A:
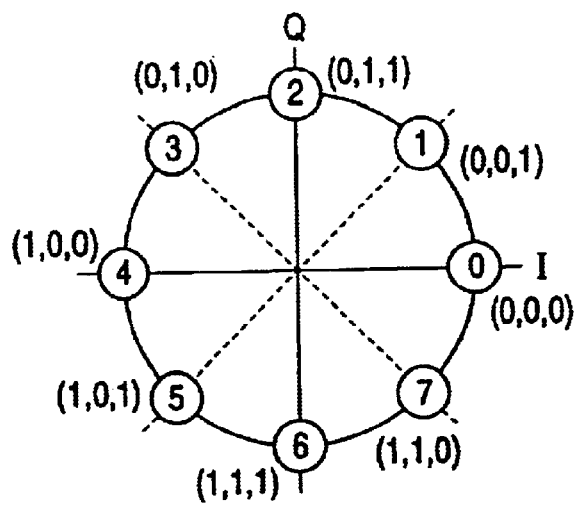
FIG. 2(a) to 2(c) are prior art pictorial illustrations of signal point arrangements used for description of BPSK mapping.
Figure 2B:
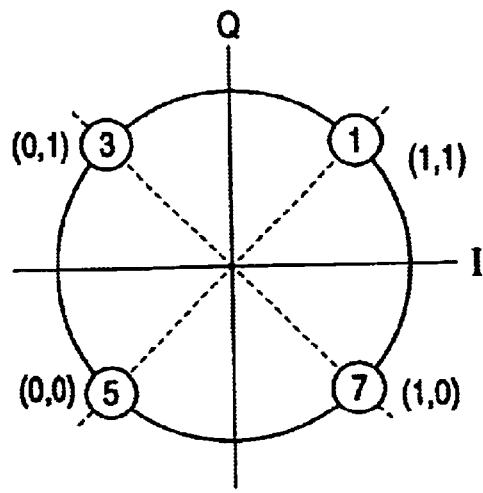
Figure 2C:
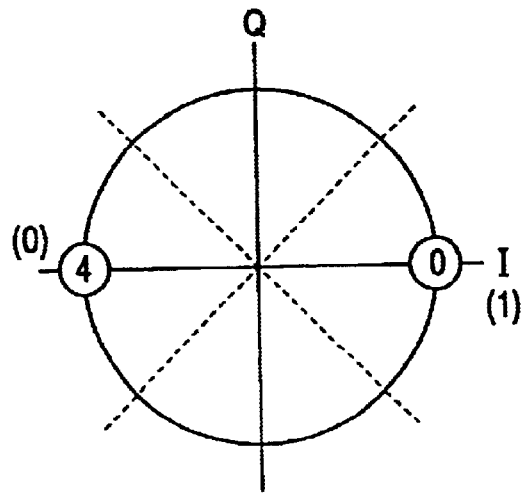
Figure 3A:
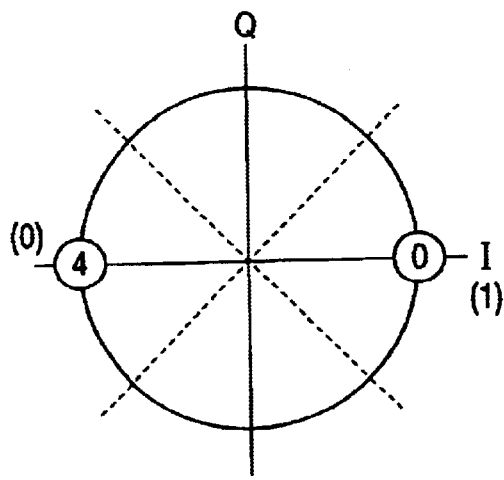
FIG. 3(a) and 3(b) are prior art pictorial illustrations of signal point arrangements of a frame synchronizing signal after passing a 0°/180° phase rotating circuit in a received signal phase detecting circuit.
Figure 3B:
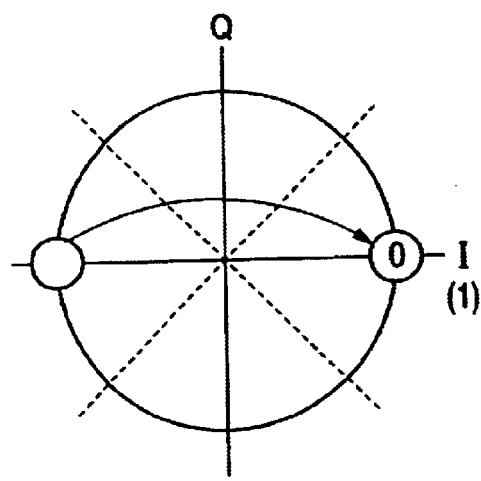
Figure 4:
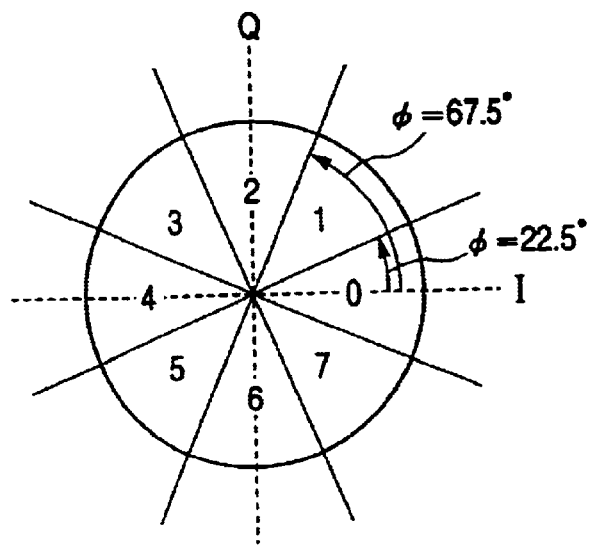
FIG. 4 is a prior art pictorial illustration used for description of a determination table for received signal phase.

Outputs of phase rotation according to the equations (2) and (3) are input to the phase determining circuit 49; phase rotation angles thereof are determined in the phase determining circuit 49; and a phase rotation angle signal RT(3) is eventually output. A description will be made of phase rotation and phase determination by the 22.5° phase rotating circuit 48 and the phase determining circuit 49 using FIGS. 6 and 7. Conventionally, a received signal phase angle has been determined from (AVI(8) and AVQ(8)) input using threshold angles of $\phi=22.5°+45°\times n$, wherein n is an integer selected from n=0 to 7, which is shown in a received signal phase determination table of FIG. 4, thereby obtaining a rotation phase signal RT(3).

Figures 6, 7:
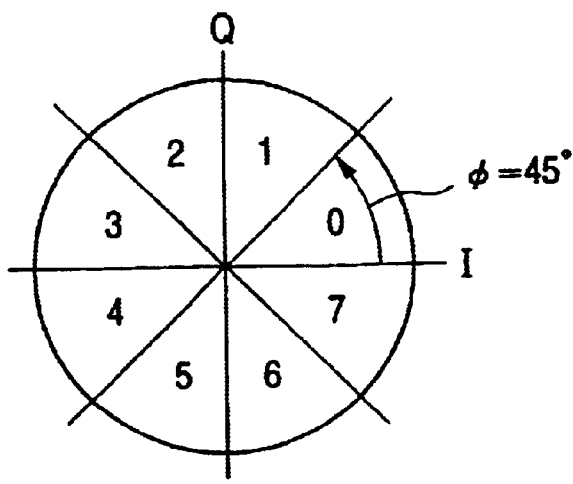
FIG. 6 is a pictorial illustration used for description of operation of a received signal phase detecting circuit according to the embodiment of the present invention.
FIG. 7 is a table used for description of operation of a received signal phase detecting circuit according to the embodiment of the present invention.

However, in the received signal phase detecting circuit according to the embodiment of the present invention, since the outputs (AVI(8) and AVQ(8)) are phase rotated by 22.5°, it may apparently be applied that $\phi=22.5°+45°\times n$, wherein n is an integer selected from n=0 to 7, while giving a phase rotation of 22.5° to a threshold angle, which is shown in FIG. 6. As a result, the outputs (RVI and RVQ) of the 22.5° phase rotating circuit 48 are input to the phase determining circuit 49 and then, it is only required to determine which of phase areas shown in FIG. 6 the inputs (RVI and RVQ) resides in.

Therefore, determination of a received signal phase angle can simply be performed using the input signals (RVI and RVQ) with a comparator or the like without using table conversion. Determination of which of 4 quadrants on the I-Q vector plane shown in FIG. 6 the received signal phase angle resides in can be obtained from a sign of a signal (RVI and RVQ). Further, in order to perform determination in connection with threshold angles of 45°×n, where n is an integer selected from n=1, 3, 5, 7, at which each quadrant is divided into two, for example, determination on a phase rotation angle signal RT(3)=0 or a phase rotation angle signal RT(3)=1, magnitudes of absolute values of the respective signals (RVI and RVQ) are used for the purpose. Determination on a phase angle shown in FIG. 6 can be realized using the phase determining circuit 49 that performs determination shown in FIG. 7 based on the above described relations.

According to the procedures as describe above, the received signal phase determining circuit 47 conventionally configured so that table conversion is performed using a ROM is replaced with the 22.5° phase rotating circuit 48 configured by a multiplier and an adder and the phase determining circuit 49 configured by a simple determining circuit, thereby largely reducing a circuit scale when incorporated into an integrated circuit.

Then, a description will be made of a first modification of the received signal phase detecting circuit according the embodiment of the present invention.

Figure 8:
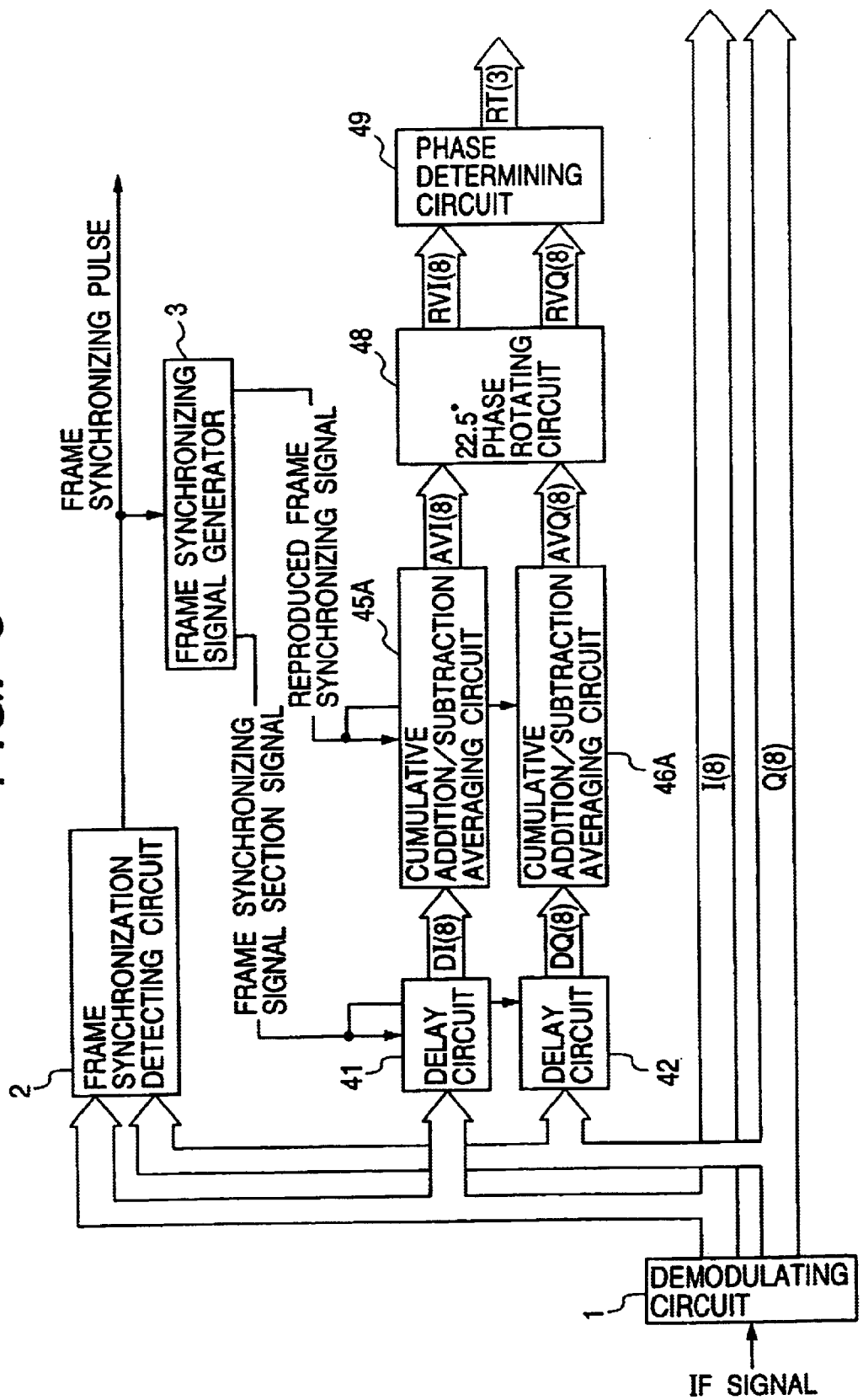
FIG. 8 is a block diagram showing configuration of first modification of a received signal phase detecting circuit according to the embodiment of the present invention.

In the first modification of the received signal phase detecting circuit according to the embodiment of the present invention, as shown in FIG. 8, cumulative addition/subtraction averaging circuits 45A and 46A substitutes for the 0°/180° phase rotating circuit 43 and the cumulative averaging circuits 45 and 46 in the received signal phase detecting circuit according to the embodiment of the present invention, and outputs DI(8) and DQ(8) of the delay circuits 41 and 42 are supplied to the cumulative addition/subtraction averaging circuits 45A and 46A. When a bit stream of a reproduced frame synchronizing signal output from the frame synchronizing signal generator 3 is logic "1", corresponding symbols in symbol streams output from the delay circuits 41 and 42 are respectively processed in cumulative addition over the section of a flame synchronizing signal section signal; when the bit stream of a reproduced frame synchronizing signal output from the frame synchronizing signal generator 3 is logic "0", corresponding symbols in symbol streams output from the delay circuits 41 and 42 are respectively processed in cumulative subtraction over the section of a frame synchronizing signal section signal. In the same circuits 45A and 46A, subsequent to the cumulative addition operation or cumulative subtraction operation, an averaging processing is performed and outputs AVI(8) and AVQ(8) from the cumulative addition/subtraction averaging circuits 45A and 46A are supplied to the 22.5° phase rotating circuit 48.

At this point, when an operation of the 0°/180° phase rotating circuit 43 in the received signal phase detecting circuit according to the embodiment of the present invention is considered, 180° phase rotation is equivalent to inversion of a code on each of the respective axes. Therefore, cumulative addition of a received symbol phase-rotated by 180° on each axis is equal to cumulative subtraction thereof on each axis. Therefore, the 0°/180° phase rotating circuit 43 and the cumulative averaging circuits 45 and 46 can be replaced with the cumulative addition/subtraction averaging circuits 45A and 46A. The reason why the results of cumulative addition and subtraction receive averaging processing is that a signal point arrangement can be obtained in a stable manner even when a minute change in phase or a change in amplitude of a received base band signal due to deterioration in C/N ratio in reception occurs.

Therefore, if the 0°/180° phase rotating circuit 43 is constituted of table conversion using ROM, a memory capacity 128 k bytes ($=2^{16}\times16$ bits) of ROM constituting the 0°/180° phase rotating circuit 43 can be saved and a circuit scale can be further reduced in the first modification as compared with the case of the received signal phase detecting circuit according to the embodiment of the present invention.

Next, a description will be made of a second modification of the received signal phase detecting circuit according to the embodiment of the present invention.

Figure 9:
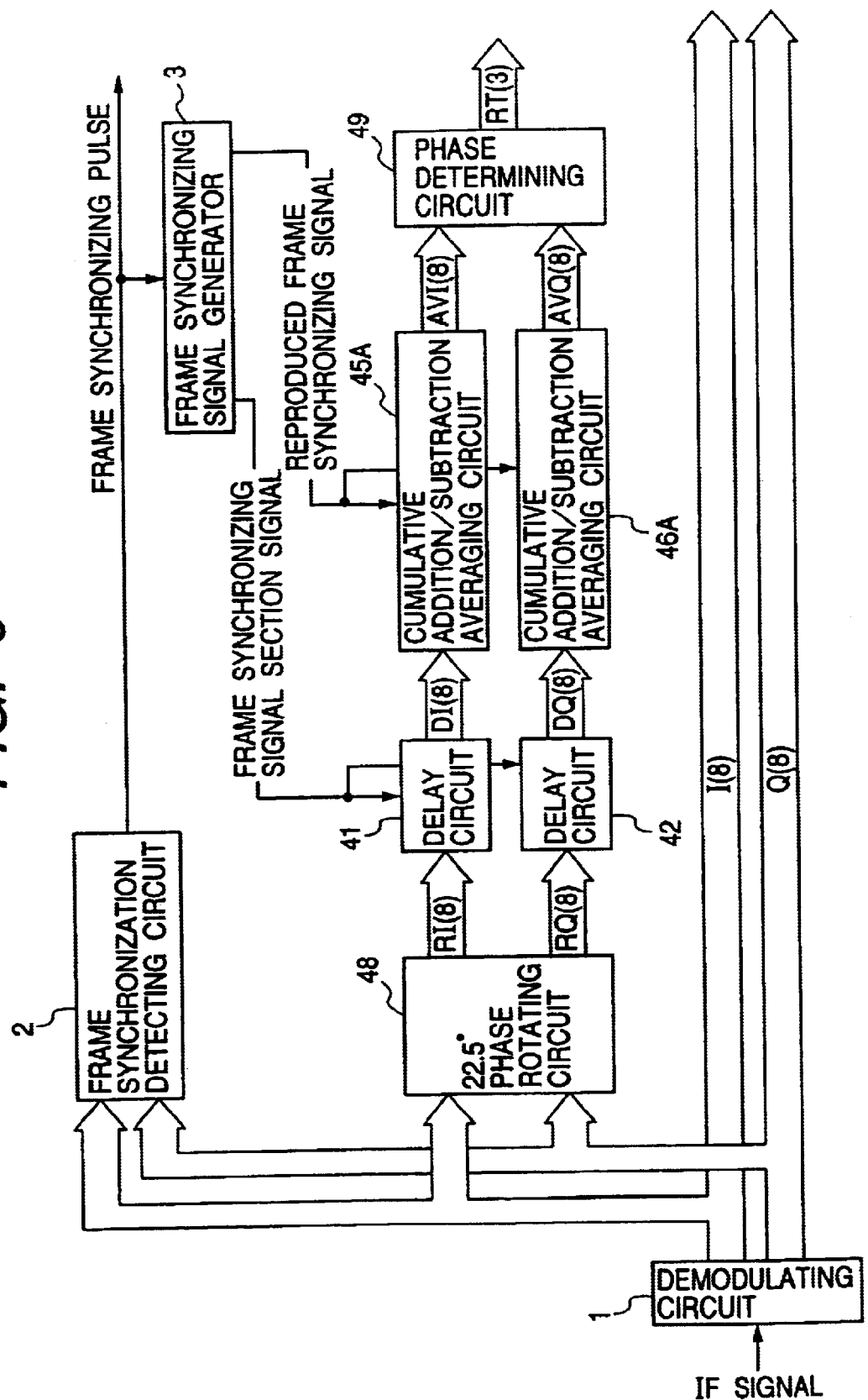
FIG. 9 is a block diagram showing a configuration of second modification of a received signal phase detecting circuit according to the embodiment of the present invention.

In the second modification of the received signal phase detecting circuit according to the embodiment of the present invention, as shown in FIG. 9, phases of demodulated base band signal outputs from the demodulating circuit 1 receive a phase rotation of 22.5° by the 22.5° phase rotating circuit 48 in the first modification of the received signal phase detecting circuit according to the embodiment of the present invention, phase rotation outputs from the 22.5° phase rotating circuit 48 are sent out to the delay circuits 41 and 42, outputs from the delay circuits 41 and 42 are supplied to the cumulative addition/subtraction averaging circuits 45A and 46A and outputs from the cumulative addition/subtraction averaging circuits 45A and 46A are sent out to the phase determining circuit 49. That is, in the second modification of the received signal phase detecting circuit according to the embodiment of the present invention, the 22.5° phase rotating circuit 48 in the first modification of the received signal phase detecting circuit according to the embodiment of the present invention is shifted to a stage preceding the delay circuits 41 and 42.

In the second modification of the received signal phase detecting circuit according to the embodiment of the present invention, since the above described configuration is adopted, outputs RVI(8) and RVQ(8) that are obtained by performing a phase rotation of 22.5° in the 22.5° phase rotating circuit 48 on outputs from the cumulative addition/subtraction averaging circuits 45A and 46A in the first modification shown in FIG. 8 of the received signal phase detecting circuit according to the embodiment of the present invention are equal to outputs AVI and AVQ that are obtained by performing a cumulative addition/subtraction averaging operation in the cumulative addition/subtraction averaging circuits 45A and 46A on 22.5° phase-rotated frame signals that have been obtained by performing phase rotation of 22.5° on demodulated base band signals I(8) and Q(8) in the 22.5° phase rotating circuit 48.

Therefore, the 22.5° phase rotating circuit 48 shown in FIG. 8 may be arranged to be at a stage preceding the delay circuits 41 and 42 without any problem as shown in FIG. 9.

There is a case where a circuit that performs 22.5° phase rotation on demodulated base band signals I(8) and Q(8) is included in the demodulating circuit 1 of FIG. 9 and in the case, outputs therefrom can be used, thereby making a configuration of FIG. 9 further simple.

According to the second modification of the received signal phase detecting circuit according to the embodiment of the present invention, the 0°/180° phase rotating circuit 43 and the cumulative averaging circuits 45 and 46 that have conventionally been used are replaced with the cumulative addition/subtraction averaging circuits 45A and 46A. Further, if the 0°/180° phase rotating circuit 43 has table conversion using ROM, a memory capacity of 128 k bytes (=$2^{16 \times 16}$ bits) can be saved, thereby enabling a circuit scale to be smaller.

It should be noted that in the received signal phase detecting circuit according to the embodiment of the present invention and the first and second modifications thereof, it is exemplified that determination can be performed in a simple circuit configuration by using the 22.5° phase rotating circuit 48 instead of table conversion that performs determination on an actual received signal phase, while an angle by which phase rotation is performed may be not only 22.5° but also the following angles: 67.5°, 112.5°, 157.5°, 202.5°, 247.5°, 292.5° and 337.5°.

Figure 11:
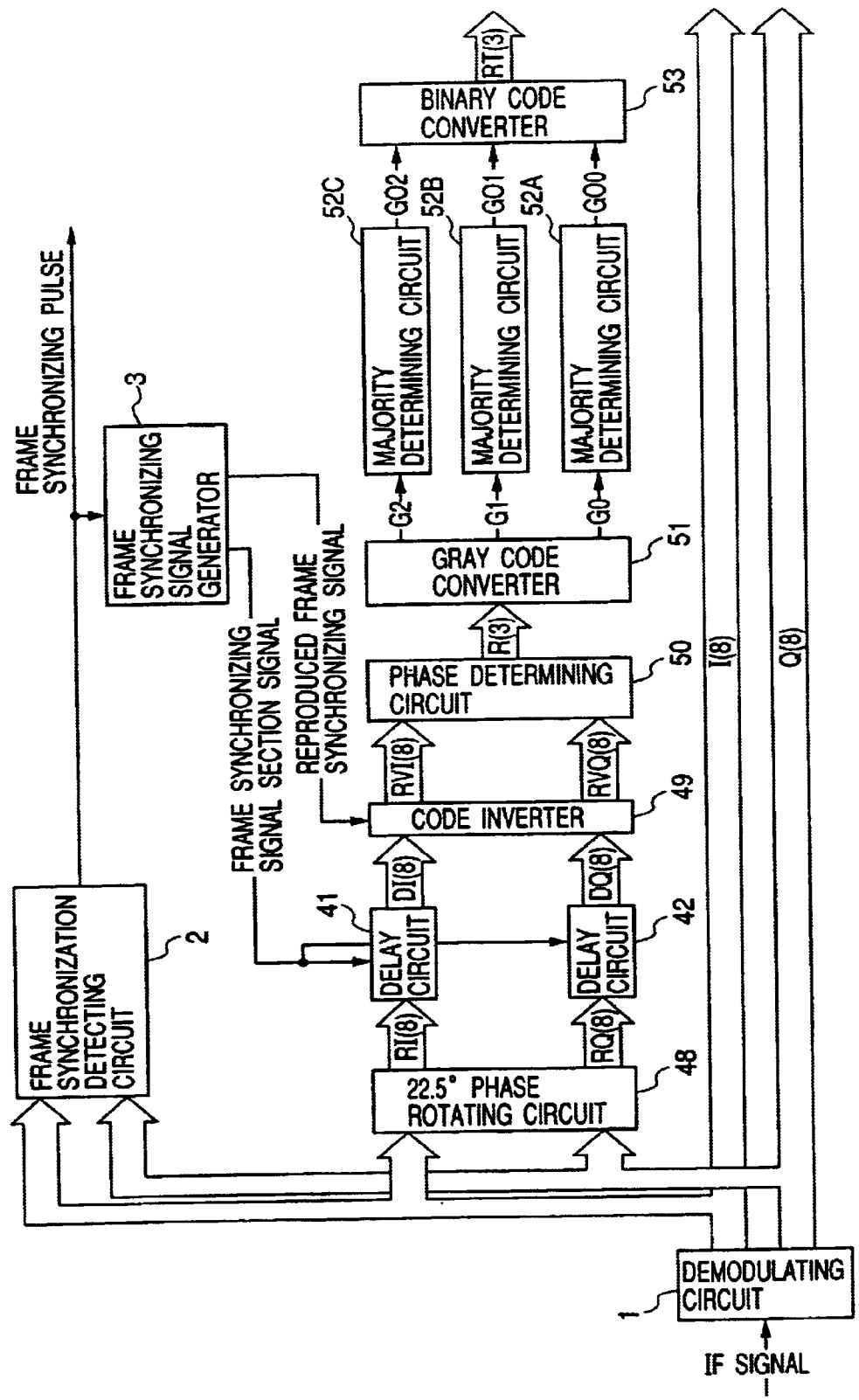
FIG. 11 is a block diagram showing configuration of a received signal phase detecting circuit according to a second embodiment of the present invention.

In the cases, a phase rotation angle signal RT(3) in the received signal phase determining circuit is only required to be changed according to a phase rotation angle that is desired to be implemented. Phase rotation angle signals RT(3) in cases of rotations of the above described 67.5°, 112.5°, 157.5°, 202.5°, 247.5°, 292.5° and 337.5° are shown in FIG. 10. FIG. 11 is a block diagram showing configuration of a received signal phase detecting circuit according to a second embodiment of the present invention.

A received signal phase detecting circuit according to the second embodiment of the present invention comprises: a demodulating circuit 1; a frame synchronization detecting circuit 2; and a frame synchronizing signal generator 3 and in addition, a 22.5° phase rotating circuit 48 constituting of a block for detection of a received signal phase ; delay circuits 41 and 42; a code inverter 59; a phase determining circuit 49; a gray code converter 51; majority determining circuits 52A to 52C; and a binary code converter 53.

That is, in the received signal phase detecting circuit according to the second embodiment of the present invention, base band signals demodulated in the demodulating circuit 1 are supplied to the frame synchronization detecting circuit 2, a frame synchronizing signal is detected in the frame synchronization detecting circuit 2 and a frame synchronizing pulse based on the frame synchronizing signal is supplied to the frame synchronizing signal generator 3. A frame synchronizing signal period signal and a reproduced frame synchronizing signal are respectively sent out from the frame synchronizing signal generator 3 that have received the frame synchronizing pulse to the delay circuits 41 and 42, and the code inverter 59.

On the other hand, base band signals I(8) and Q(8) demodulated in the demodulating circuit 1 are supplied to the 22.5° phase rotating circuit 48 and the signals receive 22.5° phase rotation there. Phase rotation outputs RI(8) and RQ(8) from the 22.5° phase rotating circuit 48 are supplied to the delay circuits 41 and 42.

Description will first be made of the 22.5° phase rotation of the base band signals I(8) and Q(8). The phase rotation in the 22.5° phase rotating circuit 48 is effected according to the following equations (4) and (5):

$$RI = I \cos(22.5°) - Q \sin(22.5°) \quad (4)$$

$$RQ = I \sin(22.5°) + Q \cos(22.5°) \quad (5)$$

The delay circuits 41 and 42 that have received a frame synchronizing signal section signal delay a symbol stream of a frame synchronizing signal that is multiplexed into base band signals that have received 22.5° phase rotation from outputs RI(8) and RQ(8) phase-rotated according to the equations (4) and (5) in the 22.5° phase rotating circuit 48 so that the symbol stream of a frame synchronizing signal that is multiplexed into base band signals, and a bit stream of a reproduced frame synchronizing signal that is sent out from the frame synchronizing signal generator 3 coincide with each other in timing at the input end position of the code inverter 59.

The base band signals DI(8) and DQ(8) that have been delayed by the delay circuits 41 and 42 are input to the code inverter 59. The output gates of the delay circuits 41 and 42 are opened only during a symbol stream section of a frame synchronizing signal with 16 symbols by a frame synchronizing signal section signal output from the frame synchronizing signal generator 3. Further, a reproduced frame synchronizing signal output from the frame synchronizing signal generator 3 and the symbol stream of the frame synchronizing signal, as described above, are made to coincide with each other in timing by the delay circuits 41 and 42 at the input of the code inverter 59.

Then, in the code inverter 59, in a case where a bit of the reproduced frame synchronizing signal is logic "0", the corresponding symbols of symbol streams DI(8) and DQ(8) of frame synchronizing signals input to the code inverter 59 are output after inverted respectively, while in a case where the bit of the reproduced frame synchronizing signal is logic "1", the corresponding symbols of symbol streams DI(8)

and DQ(8) of frame synchronizing signals input to the code inverter 59 are output unchanged without inversion.

Therefore, while the 0°/180° phase rotating circuit 43 with table conversion using ROM has conventionally employed, the circuit can be replaced with the code inverter 59 since an operation of the 0°/180° phase rotating circuit 43 is equal to a code invert operation on each of the axes.

Outputs RVI and RVQ from the code inverter 59 are input to the phase determining circuit 49 and phase determination is performed using threshold angles as shown in FIG. 6. The phase determination in the circuit is different from the conventional phase determination shown in FIG. 4 and since input signals to be determined have received a 22.5° phase rotation in the 22.5° phase rotating circuit 48 arranged at the preceding stage, it is apparent that threshold angles, which are used for reception phase determination, may also be phase rotated by 22.5° and thereafter set so that the angles φ=45°×n, where n is an integer selected from n=0 to 7. This is shown in FIG. 6. As a result, inputs RVI and RVQ are only required to be determined in the phase determining circuit 49 on which of the phase areas shown in FIG. 6 the inputs resides in.

Therefore, similar to the embodiment shown in FIG. 5, the conventional received signal phase determining circuit 47 with table conversion using ROM is replaced with the phase determining circuit 49 comprising the 22.5° phase rotating circuit 48 configured by a multiplier and an adder and a simple determining circuit, thereby reducing a circuit scale when incorporated in an integrated circuit by a great margin.

A phase rotation angle signal RT(3) that is based on a phase rotation angle determined in the phase determining circuit 49 is supplied to the gray code converter 51 to be gray coded according to FIG. 12(*a*). Bits G0 to G2 of a gray coded output are respectively input to the majority determining circuits 52A, 52B and 52C and majority determinations on whether a bit is "0" or "1" during a predetermined period are performed in the circuits.

Such processings are replacement of cumulative averaging in the conventional example performed on symbol streams VI(8) and VQ(8) which have been effected so that signal arrangements can be obtained in a stable manner even when there occurs a minute change in phase or a change in amplitude of a received base band signal due to deterioration in C/N ratio in reception. The outputs G00 to G02 from the majority determining circuits 52A, 52B and 52C are input to the binary code converter 53 and inversion of the conversion effected by the gray code converter 51 is performed according to FIG. 12(*b*). An output from the binary code converter 53 is output as a phase rotation angle signal RT(3).

Each of the majority determining circuits 52A to 52C can be constituted, for example, only of one 4 bit counter if a section for majority determination is a frame synchronizing symbol period, that is 16 symbols. For example, when an input signal G0 is input to the enable terminal of a counter and an output QD in the highest place of the counter is employed as a majority determination output G00, a majority output "1" is obtained if the number of bits "1" in a bit stream G0 exceeds 8. However, processing when the numbers of bits "0" and bits "1" are same as each other and other processings are required to be separately performed but a circuit scale does not become larger due to requirements for such separate processings. In the majority determining circuits in the received signal phase detecting circuits according to the second embodiment of the present invention, since determination operations are performed on respective bits of the 3-bit phase determination output R(3), three 4-bit counters and peripheral circuits for the above described processings are sufficient for the purpose.

The term "section for majority determination" is meant by a set of symbols of a frame synchronizing signal. That is, the above description associated with the term has been such that 16 symbols is a base and majority determination is performed during a predetermined period. However, according to other thoughts, different ways of processings can be available: one arbitrary symbol is taken out from the 16 symbols of each frame synchronizing signal and such arbitrary symbols are subjected to majority determinations over several frames (predetermined frames); several arbitrary bits are taken out instead of one arbitrary symbol and, likewise, the majority determinations are performed over several frames (predetermined frames); and in order to delete the code inverter 59 shown in FIG. 11, the output gates are opened only when a bit of a reproduced frame signal is "1", and a portion of a bit "0" is discarded.

On the other hand, in the conventional example, the base band signals I and Q each with 8 bits are necessary to respectively receive cumulative addition in 16 times. When sets of 8 bits are summed to perform cumulative addition in a total of 16 times, a resulted number amounts to 12 bit wide one as the maximum, which requires an adder with 12 bits as the lowest number of places and at least 12 latch circuits. The set is required for each of the base band signals I and Q, thereby increasing a circuit scale.

It is same as in a conventional way that, in signal processings in stages after the binary code converter 53, the base band signals I(8) and Q(8) are subjected to opposite phase rotation so as to be in absolute phase based on a phase rotation angle signal RT(3) signal that is an output from the binary code converter 53.

In the above description, it is also acceptable that the output R(3) of the phase determining circuit is directly input to the majority determining circuits and outputs from the majority determining circuits are adopted as the phase rotation angle signal RT(3). However, since the difference in bit between two adjacent phase determination values is 1 bit by one time gray-coding, even when a false determination is effected in phase determination because of a minute change in phase or a change in amplitude of a received base band signal due to deterioration in C/N ratio in reception, an influence thereof can be suppressed to its minimum. That is, a combination of the gray code converter 51 and the majority determining circuits 52A, 52B and 52C can attain more of improvement on reliability of operation.

Further, there is also a case where a circuit in which demodulated base band signals I(8) and Q(8) are phase-rotated by 22.5° is included in the demodulating circuit 1 and in this case, outputs from the circuit can be used and the configuration of the received signal phase detecting circuit according to the second embodiment of the present invention becomes simpler.

Further, while the output R(3) from the phase determining circuit 49 are converted in the gray code converter 51 to G0 to G2, the outputs from the phase determining circuit 49 may directly be G0 to G2. Phase determination in this case performed by the phase determining circuit 49 may be determination shown in FIG. 13.

It should be noted that, while, in the received signal phase detecting circuit according to the second embodiment of the present invention, it is exemplified that determination by a simple circuit configuration is enabled instead of table conversion in which an actual received signal phase is determined by using the 22.5° phase rotating circuit 48, angles by which phase rotation is performed may, in that case, be not only 22.5° but 67.5°, 112.5°, 157.5°, 202.5°, 247.5°, 292.5° and 337.5°.

In the cases, a phase rotation angle signal R(3) in the phase determining circuit 49 is only required to be changed. Phase rotation angle signals R(3) are shown in FIG. 10 for cases where the above described 67.5°, 112.5°, 157.5°, 202.5°, 247.5°, 292.5° and 337.5° are employed in phase rotation.

According to the received signal phase detecting circuit according to the second embodiment of the present invention, the phase determining circuit 49 comprising the 22.5° phase rotating circuit 48 configured by a multiplier and an adder and a simple determining circuit are substituted for the phase determining circuit with table conversion using ROM, thereby enabling great reduction in circuit scale when being incorporated in an integrated circuit.

Further, since the 0°/180° phase rotating circuit 43 which has conventionally used is replaced with the code inverter 59, when the 0°/180° phase rotating circuit 43 has table conversion using ROM, a memory capacity of 128 k bytes ($=2^{16}\times16$ bits) can be saved. Further, the majority determining circuits 52A to 52C each with a 3-bit width are used instead of the cumulative averaging circuits 45 and 46 each with an 8-bit width, which are operated on the respective axes, thereby realizing great reduction in circuit scale.

ADVANTAGES OF THE INVENTION

As described above, according to a received signal phase detecting circuit of the present invention, there can be enjoyed effects that a circuit scale can be reduced and a chip area can be effectively used in a case of incorporation of the received signal phase detecting circuit into an integrated circuit.

What is claimed is:

1. A received signal phase detecting circuit comprising:
frame synchronizing signal capturing means for capturing a frame synchronizing signal from a demodulated base band signal;
extracting means for extracting a symbol stream in a period of a frame synchronizing signal from a demodulated base band signal at a timing at which the symbol stream coincides with a bit stream of the synchronizing signal captured and reproduced by the frame synchronizing signal capturing means; and
a cumulative addition/subtraction averaging circuit to which the symbol stream extracted by the extracting means is input and in which when a bit in a bit stream of the reproduced synchronizing signal is logic "1", a corresponding symbol in the symbol stream extracted by the extracting means is added, and when the bit in a bit stream of the reproduced synchronizing signal is logic "0", a corresponding symbol in the symbol stream extracted by the extracting means is subtracted and results of cumulative addition/subtraction are averaged over a predetermined period,
wherein a received signal phase is determined based on an output of the cumulative addition/subtraction averaging circuit.

2. A received signal phase detecting circuit comprising:
frame synchronizing signal capturing means for capturing a frame synchronizing signal from a demodulated base band signal;
extracting means for extracting a symbol stream in a period of a frame synchronizing signal from a demodulated base band signal at a timing at which the symbol stream coincides with a bit stream of the synchronizing signal captured and reproduced by the frame synchronizing signal capturing means;
0°/180° phase rotating means to which the symbol stream extracted by the extracting means is input, for outputting a corresponding symbol of the symbol stream extracted by the extracting means after performing 180° phase rotation on the corresponding symbol when a bit of a bit stream of the reproduced synchronizing signal is logic "0", and outputting a corresponding symbol of the symbol stream extracted by the extracting means after performing no phase rotation on the corresponding symbol when the bit of a bit stream of the reproduced synchronizing signal is logic "1";
a cumulative averaging circuit for summing outputs from the 0°/180° phase rotating means over a predetermined period;
a phase rotating circuit for performing phase rotation of an output from the cumulative averaging circuit by (22.5°+45°×n), where n is an integer selected from n=0 to 7; and
a phase determining circuit for determining a phase of an output from the phase rotating circuit.

3. A received signal phase detecting circuit comprising:
frame synchronizing signal capturing means for capturing a frame synchronizing signal from a demodulated base band signal;
extracting means for extracting a symbol stream in a period of a frame synchronizing signal from a demodulated base band signal at a timing at which the symbol stream coincides with a bit stream of a synchronizing signal captured and reproduced by the frame synchronizing signal capturing means;
a cumulative addition/subtraction averaging circuit to which the symbol stream extracted by the extracting means is input and in which when a bit in a bit stream of the reproduced synchronizing signal is logic "1", a corresponding symbol in the symbol stream extracted by the extracting means is added, and when the bit in a bit stream of the reproduced synchronizing signal is logic "0", a corresponding symbol in the symbol stream extracted by the extracting means is subtracted and results of cumulative addition/subtraction are averaged over a predetermined period;
a phase rotating circuit for performing phase rotation of an output from the cumulative addition/subtraction averaging circuit by (22.5°+45°×n), where n is an integer selected from n=0 to 7; and
a phase determining circuit for determining a phase of an output from the phase rotating circuit.

4. A received signal phase detecting circuit comprising:
frame synchronizing signal capturing means for capturing a frame synchronizing signal from a demodulated base band signal;
a phase rotating circuit for performing phase rotation of a demodulated base band signal by (22.5°+45°×n), where n is an integer selected from n=0 to 7;
extracting means for extracting a symbol stream in a period of a frame synchronizing signal from an output of the phase rotating circuit at a timing at which the symbol stream coincides with a bit stream of the synchronizing signal captured and reproduced by the frame synchronizing signal capturing means;
a cumulative addition/subtraction averaging circuit to which the symbol stream extracted by the extracting means is input and in which when a bit in a bit stream of the reproduced synchronizing signal is logic "1", a corresponding symbol in the symbol stream extracted by the extracting means is added, and when the bit in a bit stream of the reproduced synchronizing signal is logic "0", a corresponding symbol in the symbol stream extracted by the extracting means is subtracted and results of cumulative addition/subtraction are averaged over a predetermined period; and a phase determining circuit for determining a phase of an output from the cumulative addition/subtraction averaging circuit.

5. A received signal phase detecting circuit comprising:

frame synchronizing signal capturing means for capturing a frame synchronizing signal from a demodulated base band signal;

a phase rotating circuit for performing phase rotation of a demodulated base band signal by (22.5°+45°×n), where n is an integer selected from n=0 to 7;

extracting means for extracting a symbol stream in a period of a frame synchronizing signal from a base band signal that is phase-rotated by the phase rotating circuit at a timing at which the symbol stream coincides with a bit stream of the synchronizing signal captured and reproduced by the frame synchronizing signal capturing means;

code inverting means to which the symbol stream extracted by the extracting means is input, for inverting a code of a corresponding symbol in the symbol stream extracted by the extracting means to output the corresponding symbol after the inversion only when a bit in a bit stream of the reproduced synchronizing signal is logic "0";

a phase determining circuit that determines a phase of an output from the code inverting circuit;

a gray code converter that performs gray code conversion of an output from the phase determining circuit;

majority determining means for receiving an output of the gray code converter and performing majority determination; and a binary code converter that performs binary code conversion of an output from the majority determining means, wherein an output from the binary code converter is adopted as a received signal phase rotation angle signal.

* * * * *